No. 819,712. PATENTED MAY 8, 1906.
O. VON BEGLERBEG.
HORSE DETACHER.
APPLICATION FILED JUNE 10, 1903.
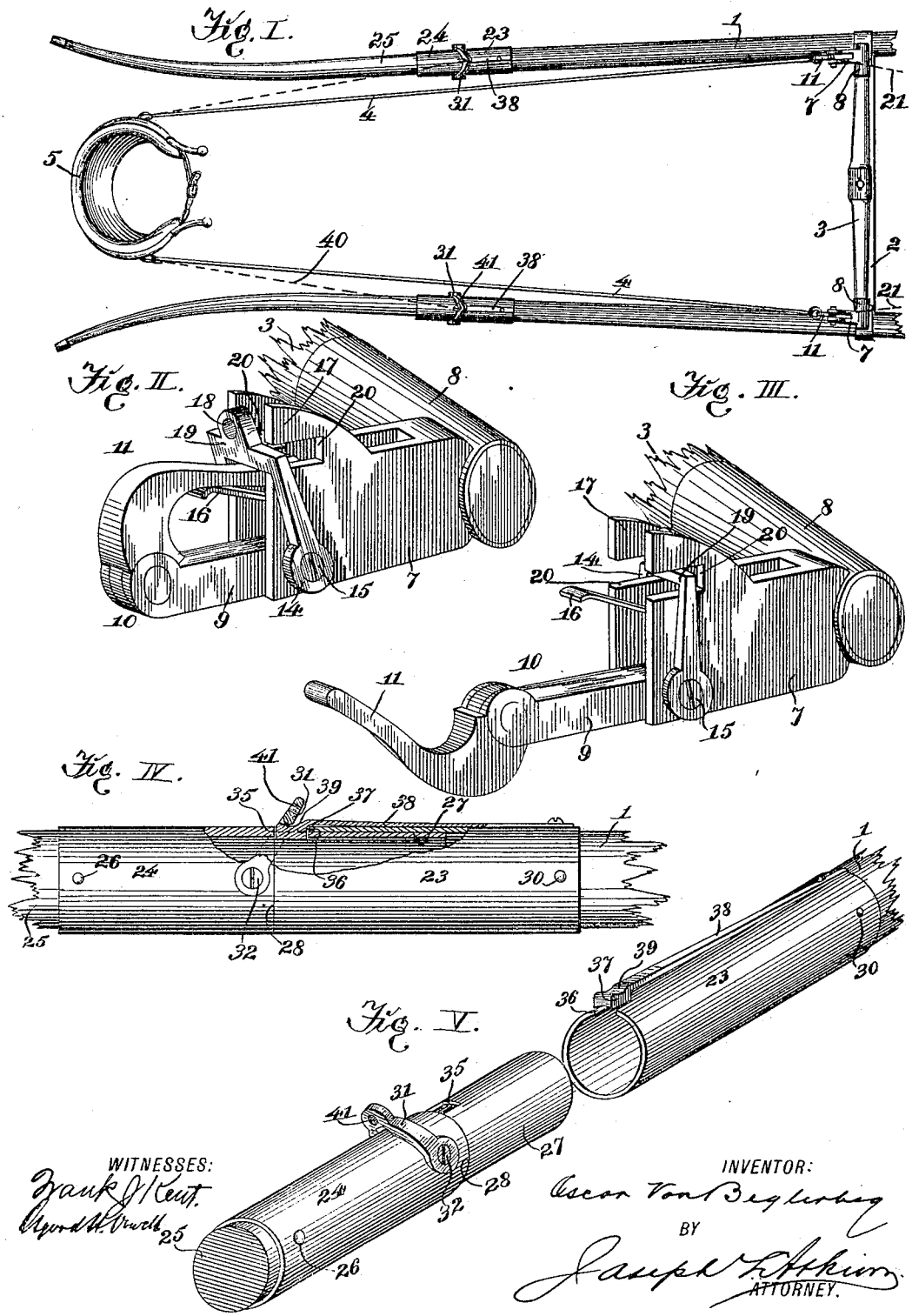
WITNESSES:
INVENTOR:
Oscar Von Beglerbeg
BY
ATTORNEY.

UNITED STATES PATENT OFFICE.

OSCAR VON BEGLERBEG, OF BRUNSWICK, GEORGIA.

HORSE-DETACHER.

No. 819,712.     Specification of Letters Patent.     Patented May 8, 1906.

Application filed June 10, 1903. Serial No. 160,912.

*To all whom it may concern:*

Be it known that I, OSCAR VON BEGLERBEG, a citizen of the United States, residing at Brunswick, in the county of Glynn and State of Georgia, have invented a new and useful Improvement in Horse-Detachers, of which the following is a specification.

My invention relates to improvements in horse-detachers, and has for its object to provide simple, cheap, effective, and easily-operated means for quickly detaching a horse from a vehicle and which under ordinary conditions does not impair the security of the animal's attachment thereto.

In the accompanying drawings, Figure I is a top plan view showing a preferred form of embodiment of my invention as applied to the shafts and swingletree of a vehicle and to a horse-collar, the latter being in position, as in practice. Fig. II is a perspective view of one extremity of a swingletree, showing a preferred form of trace-detaching hook in closed position. Fig. III is a view similar to Fig. II, but showing the trace-detaching hook open. Fig. IV is a side elevation, partly in section, of a preferred form of coupling member as applied to fragments of thill-sections. Fig. V is a perspective view of the subject-matter of Fig. IV, showing the coupling members disconnected.

Referring to the numerals on the drawings, and first with respect to Fig. I, 1 indicates the shafts or thills, assumed to be fastened to the body of a vehicle and which are connected by the usual cross-bar 2. 3 indicates an ordinary swingletree carried by the cross-bar 2. Traces 4 are illustrated as connected, respectively, at one end to the swingletree and at the other to a horse-collar 5.

My invention comprehends means whereby in case of peril, as of a runaway, the horse may be manually and readily released from the swingletree at the will of the occupant of the vehicle and becomes thereby automatically detachable from the vehicle.

The manually-operative or emergency releasing means referred to are shown in Figs. II and III and include a pair of boxes 7, each of which being preferably cast integrally with a thimble 8, that fits upon the tip of the swingletree, has a forwardly-projecting finger 9, to which is hinged, as upon a pintle 10, a trace-detaching hook 11. It being necessary that the hook 11 be releasably securable in a closed position, as shown in Fig. II, I provide a keeper 14, preferably clevis-shaped, which straddling the box 7 is pivoted, as indicated at 15, to the box upon its opposite sides. Without engagement of the keeper 14 with the hook 11 a pull upon the trace connected with it tends to open it; but I prefer to provide for the positive and automatic outthrow of the hook upon its release from the keeper. For that purpose I prefer to employ a suitable spring-plate 16, preferably securely mounted at one end within the box 7. Its free end projects forwardly under the path of the hook 11, acting upwardly against which, as shown in Fig. II, it tends when the latter is in its closed position to force it open. The keeper 14 is preferably provided with means for preventing its accidental disengagement from the hook 11. With that end in view I provide upon opposite sides of the box 7 ears 17, which include and guard an eye 18 upon the cross-over 19 of the keeper, that works into and out of slots or recesses 20 in the respective ears. The eye 18 affords a convenient mode of application of means for the manual release of the keeper which are represented by a pull-cord 21. (Shown in Fig. I.)

In Figs. IV and V, I illustrate a simple and therefore preferred form of embodiment of detachable coupling members between separable thill-sections. They comprise, as illustrated, a pair of telescoping sleeves 23 and 24, secured, respectively, to the ends of the thills 1 and to terminal sections 25 thereof. The coupling member 24, which is fixed to the terminal section 25 of a shaft, as by a bolt 26, comprises, preferably, a reduced portion or spigot 27, defined by a shoulder 28. The spigot 27 should be of such length as to afford requisite rigidity to the union of the members 23 and 24 and is adapted to enter the hollow end of the sleeve 23, which is secured to the end of the shaft, as by a bolt 30.

In order to insure positive union and at the same time provide for ready disconnection of the members 23 and 24, I prefer to provide upon the sleeve 23 a loop 31, similar to the keeper 14, pivoted to the sleeve, as by a bolt 32, extending through sleeve and thill-section. In the spigot 27, adjacent to the shoulder 28, an aperture, recess, or depression 35 is disposed, so as to register with an aperture 36 in the sleeve 23 when the members are assembled. With these registering apertures 35 and 36 engages the head or free end 37 of a spring-plate 38, whose opposite end is fixed to the sleeve 23, as indicated at 39. The head 37 is preferably provided across its top with a depression 39, with which the loop 31 engages and by which it is held. To make a connection between the shaft and its terminal section, the spigots 27 are driven into the sleeves 23, so that the respective apertures 35 register with the apertures 36. If each head 37, which, it should be understood, is thicker than the combined thickness of the walls of the spigot 27 and sleeve 23, be now depressed so as to fill said apertures, the spigot and sleeve will be firmly united one to the other. To keep the spring normally depressed and the members united, the loop 31 is drawn into position over the head 37 of the spring-plate 38 and into the depression 39.

To provide for the automatic disengagement of the members 23 and 24, any suitable means for swinging the loop 31 out of its position last specified may be employed—such, for example, as a cord or other flexible connection 40, uniting the horse and loop—that is to say, for example, the eye 41 of the loop and the horse-collar 5.

In operation, the traces 4 being held by the hooks 11 and the shaft-sections coupled, as described, a pull by the occupant of the vehicle upon the cords 21 will release the hooks 11, whose outthrow releases the traces. The horse being thereupon detached from the vehicle, except as to the usual engagement of tugs with the thills, will by pulling upon the cords 40 separate the loop 31 from its engagement with the head 37 of the spring-plate 38 and disengage the members 23 and 24. Thereupon the horse liberated from the vehicle may proceed harmlessly, carrying the terminal sections of the shafts along with him.

If two or more horses be hitched to a vehicle, the same result may be attained by uniting the tongue by members 23 and 24 and providing each swingletree with its equipment of releasable hooks 11.

What I claim is—

1. In a horse-detacher the combination with emergency releasing means for detaching an animal from the swingletree of a vehicle, of a member having a detachable terminal section, means of separably uniting the parts, and means for automatically separating said parts by continued movement of the animal upon operation of the emergency releasing means.

2. In horse-detaching mechanism, a box securable to the tip of a swingletree, a hook hinged therein, a keeper for releasably securing the hook in a closed position, and means for actuating the keeper to release the hook.

3. In horse-detaching mechanism, a box securable to the tip of a swingletree, a hook hinged therein, a keeper for releasably securing the hook in a closed position, means for actuating the keeper to release the hook, and means of positive and automatic outthrow of the hook.

4. In horse-detaching mechanism, a box securable to the tip of a swingletree, a hook hinged therein, a keeper for releasably securing the hook in a closed position, means for actuating the keeper to release the hook, and means for preventing the accidental release of the hook.

5. In horse-detaching mechanism, a box securable to the end of a swingletree and provided with a forwardly-projecting finger, a hook hinged to the finger, a clevis-shaped keeper pivoted to the sides of the box adapted to releasably secure the hook, means for actuating the keeper to release the hook, and a spring-plate acting against the hook and tending to cause positive automatic outthrow thereof.

6. In horse-detaching mechanism, a box securable to the end of a swingletree and provided with a forwardly-projecting finger, a hook hinged to the finger, a clevis-shaped keeper pivoted to the sides of the box adapted to releasably secure the hook, means for the manual retraction of the keeper, comprising an eye upon the keeper and a pull-cord attached to the eye; ears upon opposite sides of the box, including and guarding the eye, and a spring-plate mounted in the box acting against the hook and tending to cause positive automatic outthrow thereof.

7. In horse-detaching mechanism, the combination with separable thill-sections, of detachable coupling members.

8. In horse-detaching mechanism, a detachable coupling member for separable thill-sections, comprising a pair of telescoping sleeves attached respectively to the thill-sections, and means adapted to insure positive union and ready disconnection of the sleeves as required.

9. In horse-detaching mechanism a detachable coupling member for separable thill-sections, comprising a sleeve fastened on one thill-section, provided with a spigot adapted to enter the hollow end of a corresponding sleeve secured to the end of the other section, apertures in the respective sleeves adapted to register when the parts are assembled, a spring-plate on one of the sleeves provided with a head adapted to fit said registering apertures, and means for actuating the head to fill the apertures as required.

10. In horse-detaching mechanism a detachable coupling member for separable thill-sections, comprising a sleeve fastened on one thill-section, provided with a spigot adapted to enter the hollow end of a corresponding sleeve secured to the end of the other section, apertures in the respective sleeves adapted to register when the parts are assembled, a spring-plate on one of the sleeves provided with a head adapted to fit said registering apertures, a depression across the top of the head, and a loop pivoted to one of the sleeves and adapted to engage the depression in the head.

11. In horse-detaching mechanism a detachable coupling member for separable thill-sections, comprising a sleeve fastened on one thill-section, provided with a spigot adapted to enter the hollow end of a corresponding sleeve secured to the end of the other section, apertures in the respective sleeves adapted to register when the parts are assembled, a spring-plate on one of the sleeves provided with a head adapted to fit said registering apertures, a depression across the top of the head, a loop pivoted to one of the sleeves and adapted to engage the depression in the head, and means for automatically operating the said loop.

In testimony whereof I have signed my name to this specification, in the presence of two subscribing witnesses, this 5th day of May, 1903.

OSCAR VON BEGLERBEG.

Witnesses:
   EDGAR F. CONEY,
   HOYT W. GALE.